UNITED STATES PATENT OFFICE 2,194,842

SOFT LECITHIN PREPARATION

Gustav Adolf Wiesehahn, New York, N. Y., assignor, by mesne assignments, to American Lecithin Company, Cleveland, Ohio, a corporation of Ohio No Drawing. Application February 25, 1936, Serial No. 65,686

6 Claims. (Cl. 252—1)

This invention relates to the vegetable phosphatides isolated from the soya bean, and has particular reference to a new and novel means of reducing the consistency of these preparations with a minimum percentage of added ingredients, whereby the compositions may be more readily mixed or dispersed into various compositions. Specifically, it contemplates the softening of the consistency of these compositions by the addition thereto of free fatty acids.

Vegetable lecithin as prepared from soybeans consists essentially of lecithin and other phosphatides in admixture with soybean oil. A sludge is obtained by separation of the lecithin from the extracted or expressed oil, after first adding water to hydrate the lecithin; the mixture of phosphatides, oil and water is then dried under reduced pressure. The resultant product contains about 55–65% phosphatides, the remainder being mainly soybean oil.

The consistency of commercial soybean lecithin is not uniform, but varies with the type of bean and other factors among which the climatic conditions during the growth of the plants and sometimes storage conditions probably are most influential. As consequences of such differences I found, for example, the saturation of the fatty acids and the percentage of carbohydrates in the phosphatide complex to vary.

This difference in consistency of the phosphatides is of rather serious technical consequences, as lecithin is used almost exclusively in relatively small quantities, in admixture with various liquids and solids, in which its effect depends on its thorough and uniform incorporation. In general, the lecithin possesses the consistency of a hard wax, and heat and prolonged agitation are required to disperse the product.

The dilution of the phosphatide mixture with oil is not feasible because of the subsequent separation of the oil on storage, aside from the rather small effect. For example, 5% of soybean oil, when added to a mixture of 65% phosphatides and 35% oil, had practically no effect on the consistency.

Consequently a number of attempts have been made to produce more readily dispersable, fluid lecithin preparations, for example, by the addition of glycerine. However, a high percentage is needed to produce the desired result.

I have discovered that softer compositions can be obtained from soybean phosphatide preparations, by adding to the compositions rather small percentages of fatty acids, for example, 2% of solid stearic acid added to the preparation with which 5% liquid soybean oil gave no results, gave a considerably softened consistency. Larger additions, such as 5–10%, reduced the consistency still further, so that finally at ordinary room temperature, a viscous fluid resulted. This reaction is generic for fatty acids. Other organic acids and inorganic acids do not appear to produce this liquefication, for example, lactic, tartaric and phosphoric acids all have little or no effect.

The low molecular fatty acids (acetic to butyric) are unsuitable because of their odor and corrosiveness, although they are most effective, weight for weight, in softening the consistency. For technical purposes, lauric acid in the form of coconut acid oil gives satisfactory and economical results. Where freedom from odor is required, such as in lecithin for food products I prefer to use the U. S. P. grade of stearic acid. The fatty acid can best be added by dissolving it in the molten lecithin with agitation, as shown in the following typical examples of my invention:

Example 1

To 100 pounds commercial soybean lecithin as it is obtained by the application of water or water vapor from the oil extracted by means of a solvent from soybeans, containing phosphorus in a quantity of about 2.3% and about 40% crude soya oil, 5 to 10 pounds stearic acid are added and heat is applied to soften the mixture sufficiently to allow thorough mechanical agitation, for example 60°. After the stearic acid has been dissolved in the phosphatide-oil mixture the product will be so fluid on cooling to 20° C. that it can be poured. In this form it can much more easily be incorporated in other products, such as fats, mineral oil, dough, and others. Another advantage is that the product will remain more homogeneous and the separation of an oily fraction on storage is retarded. Instead of stearic any other fatty acid or mixtures of fatty acids may be used, such as occur in coconut, corn, cottonseed oil, cacao butter, lard, and other fats and oils in natural or hydrogenated condition.

Example 2

To 100 pounds of the phosphatide-oil mixture of soybean sludge containing 2% lipoid phosphorus or more, and 35% oil, 10 pounds of a coconut oil which contains in the neighborhood of 75% of free fatty acids, figured as lauric, are added with the application of heat and mechanical mixing. The resulting product is suitable, for example, for the use in paints, where its greater softness facilitates mixing.

Example 3

One hundred pounds soybean phosphatides from which most of the oil has been removed by washing with a solvent such as acetone and then replaced by cacao butter to a total fat content of 25% are warmed with 5 pounds stearic acid and agitated until the stearic acid is completely dissolved. The resulting product can be moulded into blocks which are solid at 20° C., the same as the untreated material. But on heating it will soften considerably earlier and retain a softer consistency much longer on cooling than the untreated preparation. Thus its incorporation into candy batches is facilitated and the avoiding of high temperatures serves to preserve the cacao flavor. A similar effect is exerted on products where coconut stearin takes the place of cacao butter; but because of the lower melting point added acid can be detrimental to the mouldability.

As can be seen from these descriptions, I do not limit my invention to soybean oil-soybean phosphatide mixtures, but extend it also to mixtures of phosphatides from which the oil has largely been removed and replaced by another fat or oil. The addition of fatty acids to the oil-free phosphatides, however, I found to have no softening effect, nor was it observable with phosphatides from egg yolk or corn oil, the action being merely a dilution in these cases.

While the free acid generated during spontaneous fermentation of soybean sludge does not affect the consistency of the lecithin when dried, fatty acid can also be generated by slight artificial hydrolysis of the sludge before or during drying, as, for example, by the addition of a small amount of acid, which may be volatile so as to be removed during the drying process or nonvolatile. Also the enzyme lipase may be allowed to act on the sludge for a limited time before drying.

I have found that 10% of free fatty acid generally gives sufficient fluidity with commercial soybean lecithin preparations, but more may be added if desired. Where 20% or more are added, the further effect becomes largely one of dilution; if solid acids are used in this concentration, for example, the viscosity goes up instead of down.

I claim:

1. The method of softening and controlling the consistency of a soya phosphatide composition comprising a major portion of phosphatide and a minor portion of fatty oil, comprising increasing the free fatty acid content of the composition, the amount of the increase of fatty acid being sufficient to produce a softer composition than the composition would be without the increased fatty acid.

2. The method of softening and controlling the consistency of a soya phosphatide composition comprising a major portion of phosphatide and a minor portion of fatty oil, comprising adding free fatty acid to the composition, the amount of added fatty acid being sufficient to produce a softer composition than the composition would be without the added fatty acid.

3. The method of softening and controlling the consistency of a soya phosphatide composition containing a minor proportion of a fatty oil which comprises adding to the phosphatide composition up to 20% thereof, of free fatty acid in amounts sufficient to produce a softer composition than the composition would be without the added fatty acid.

4. The method of softening and controlling the consistency of soya phosphatides which consists essentially in mixing a minor amount of a fatty substance selected from the class consisting of fatty oils and fats, and a minor amount of free fatty acid with said soya phosphatides the amounts of added fatty acids being sufficient to produce a softer composition than the composition would be without the added fatty acid.

5. The method of softening and controlling the consistency of a soya phosphatide composition containing a minor proportion of a fatty oil which comprises adding stearic acid to said composition, the amount of stearic acid being sufficient to produce a softer composition than the composition would be without added fatty acid.

6. The method of softening and controlling the consistency of a soya phosphatide composition containing a minor proportion of a fatty oil which comprises adding a minor amount of lauric acid to said composition, the amount of lauric acid being sufficient to produce a softer composition than the composition would be without the added acid.

GUSTAV ADOLF WIESEHAHN.